United States Patent
Duncan et al.

(10) Patent No.: US 7,451,259 B2
(45) Date of Patent: Nov. 11, 2008

(54) METHOD AND APPARATUS FOR PROVIDING PEER-TO-PEER DATA TRANSFER WITHIN A COMPUTING ENVIRONMENT

(75) Inventors: Samuel H. Duncan, Arlington, MA (US); Wei-Je Huang, Fremont, CA (US); John H. Edmondson, Arlington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 896 days.

(21) Appl. No.: 11/005,451

(22) Filed: Dec. 6, 2004

(65) Prior Publication Data

US 2006/0120376 A1 Jun. 8, 2006

(51) Int. Cl.
*G06F 13/36* (2006.01)
*G06F 13/00* (2006.01)

(52) U.S. Cl. .................. 710/309; 710/240; 710/119; 710/11; 709/230

(58) Field of Classification Search ......... 710/305–315, 710/240–243, 119–125, 11–14; 709/203, 709/226, 230–237
See application file for complete search history.

(56) References Cited

U.S. PATENT DOCUMENTS

| | | | |
|---|---|---|---|
| 4,626,912 A | 12/1986 | Wilkinson et al. | |
| 5,010,477 A * | 4/1991 | Omoda et al. | ................... 712/4 |
| 5,481,555 A | 1/1996 | Wade et al. | |
| 5,822,195 A | 10/1998 | Brench et al. | |
| 5,898,888 A | 4/1999 | Guthrie et al. | |
| 5,953,538 A | 9/1999 | Duncan et al. | |
| 5,991,797 A | 11/1999 | Futral et al. | |
| 6,012,120 A | 1/2000 | Duncan et al. | |
| 6,021,456 A | 2/2000 | Herdeg et al. | |
| 6,032,232 A | 2/2000 | Lindeborg et al. | |
| 6,094,655 A | 7/2000 | Rogers et al. | |
| 6,128,690 A | 10/2000 | Purcell et al. | |
| 6,128,711 A | 10/2000 | Duncan et al. | |
| 6,275,888 B1 | 8/2001 | Porterfield | |
| 6,353,877 B1 | 3/2002 | Duncan et al. | |
| 6,535,937 B1 * | 3/2003 | Beardsley et al. | ........... 710/100 |
| 6,633,967 B1 | 10/2003 | Duncan | |
| 6,647,453 B1 | 11/2003 | Duncan et al. | |
| 6,701,387 B1 | 3/2004 | Pannel et al. | |
| 6,859,851 B1 | 2/2005 | Sheaffer | |
| 6,888,824 B1 | 5/2005 | Fang et al. | |
| 6,901,451 B1 | 5/2005 | Miyoshi et al. | |
| 6,950,885 B2 | 9/2005 | Shah | |
| 6,993,613 B2 | 1/2006 | Connor et al. | |
| 7,073,047 B2 * | 7/2006 | Kuo et al. | ................... 711/220 |
| 7,136,970 B2 | 11/2006 | Yoshiya et al. | |
| 7,155,554 B2 | 12/2006 | Vinogradov et al. | |
| 7,188,219 B2 | 3/2007 | Jeddeloh | |

(Continued)

OTHER PUBLICATIONS

International Search Report, May 8, 2006.

*Primary Examiner*—Christopher B. Shin
(74) *Attorney, Agent, or Firm*—Patterson & Sheridan, LLP (57) ABSTRACT

A method and apparatus for providing peer-to-peer data transfer through an interconnecting fabric. The method and apparatus enable a first device to read and/or write data to/from a local memory of a second device by communicating read and write requests across the interconnectivity fabric. Such data transfer can be performed even when the communication protocol of the interconnectivity fabric does not permit such transfers.

20 Claims, 4 Drawing Sheets

U.S. PATENT DOCUMENTS

| | | |
|---|---|---|
| 7,213,087 B1 | 5/2007 | Bertone et al. |
| 7,228,354 B2 | 6/2007 | Chambliss et al. |
| 2006/0007946 A1 | 1/2006 | Kastenholz et al. |
| 2006/0067225 A1 | 3/2006 | Fedorkow et al. |
| 2006/0120876 A1 | 6/2006 | Duncan et al. |
| 2006/0123142 A1 | 6/2006 | Duncan et al. |

* cited by examiner

METHOD AND APPARATUS FOR PROVIDING PEER-TO-PEER DATA TRANSFER WITHIN A COMPUTING ENVIRONMENT

CROSS-REFERENCE TO RELATED APPLICATIONS

This application contains subject matter related to the subject matter of co-pending U.S. patent application Ser. No. 11/005,451, filed Dec. 6, 2004. The aforementioned related patent application is herein incorporated by reference.

BACKGROUND OF THE INVENTION

1. Field of the Invention

Embodiments of the present invention generally relate data transfer within a computing environment and, more particularly, peer-to-peer data transfer within such a computing environment.

2. Description of the Related Art

In modern computing environments, a multitude of devices are generally interconnected to provide processing speed and flexibility within the computing environment. To create such a computing environment, various devices are connected to one another via an interconnectivity fabric such as a network or bus structure. The devices connected to the interconnectivity fabric generally contain local memory that is used by a device during a computation.

One example of such a computing environment is used for graphics processing, where a plurality of graphics processing units (GPUs) are connected to one another by an interconnectivity fabric and each GPU is coupled to a frame buffer (i.e., local memory). The frame buffer stores graphics data being processed by the individual GPUs. Generally, large amounts of data need to be processed by the GPUs to render textures and create other graphics information for display. To achieve rapid processing, the processing task is divided amongst GPUs such that components of the task are performed in parallel.

At times, in such a computing environment, the graphics processing units may be required to utilize information that is stored in the frame buffer of a peer GPU or may be required to write information to a frame buffer of a peer GPU such that the peer GPU may locally utilize that information. Presently, implementations of many interconnectivity fabric standards such as AGP, PCI, PCI-Express™, advance switching and the like enable peers to write information to another peer's address space, but do not enable reading of information stored in another peer's address space. Consequently, the graphics processing units will duplicate effort to create data that their peers have already created because they do not have access to a peer's frame buffer in peer address space where that information is stored. Alternatively, a GPU may complete processing of certain information; if that information is needed by a peer, the creator may write that information to a commonly available system memory. The system memory is accessible by any of the GPUs connected to the interconnectivity fabric. However, using common system memory for such data transfers is time consuming and increases overhead processing. Invariably, the use of common system memory slows the graphics processing.

Therefore, there is a need in the art for an improved method and apparatus of transferring information from peer-to-peer within a computing environment.

SUMMARY OF THE INVENTION

Embodiments of the present invention generally are directed to a method and apparatus for providing peer-to-peer data transfer through an interconnecting fabric. The invention enables a first device to read and/or write data to/from a local memory of a second device by communicating read and write requests across the interconnectivity fabric. Such data transfer can be performed even when the communication protocol of the interconnectivity fabric does not permit such transfers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
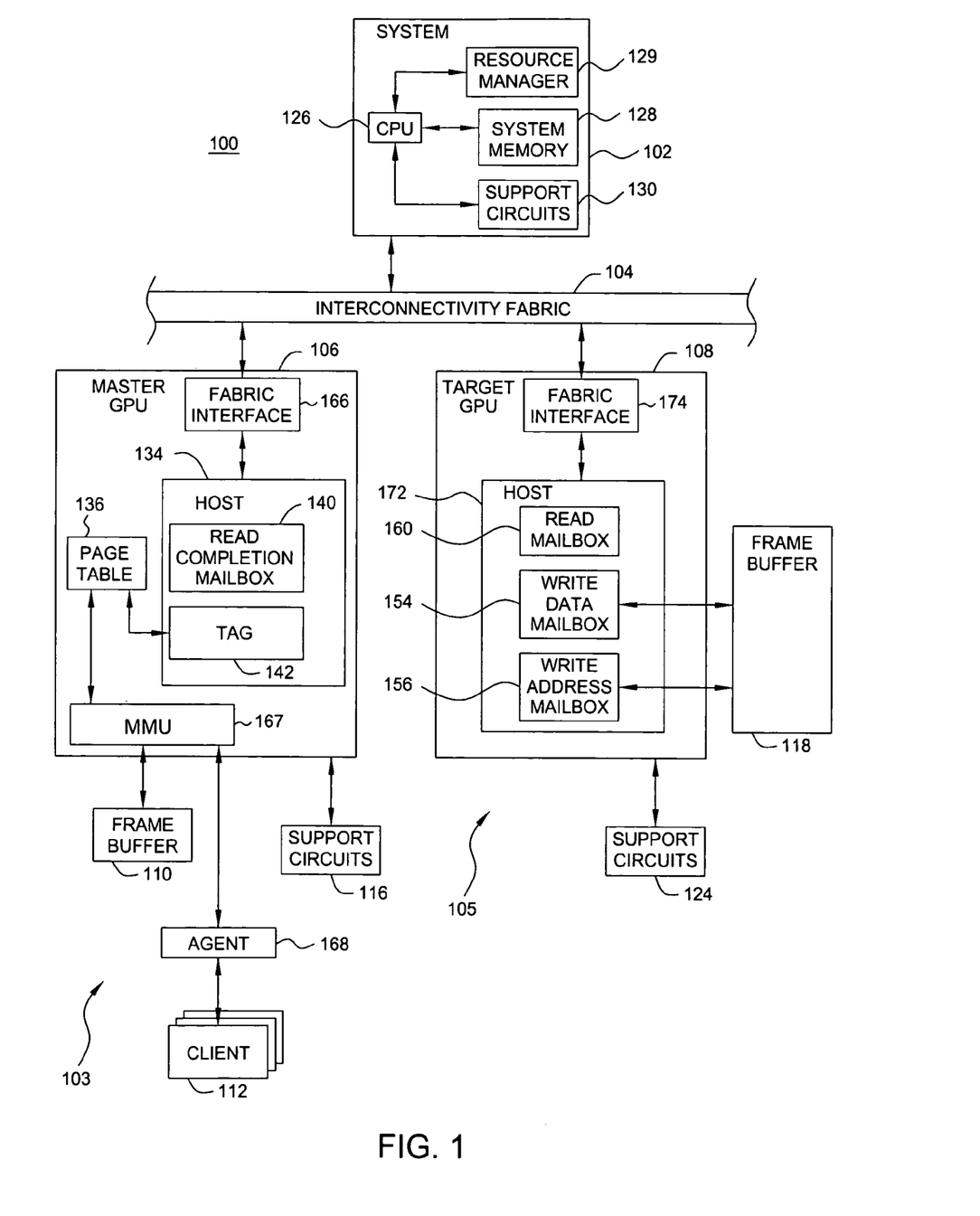
FIG. 1 depicts a computing environment in which one embodiment of the invention may be utilized.

FIG. 1 depicts a computing environment 100 comprising a system level computer 102, and interconnectivity fabric 104 and a plurality of peer devices 103 and 105. The peer devices, although they may be any form of computing device including computer systems, network appliances, storage devices, integrated circuits, microcontrollers, and the like, in the embodiment depicted in FIG. 1 the devices 103 and 105 comprise graphics processing units (GPU) 106 and 108. Although two devices 103 and 105 are depicted, those skilled in the art will understand that the invention is applicable to any number of devices. As described below, the invention provides a method and apparatus that facilitates data transfer between the peer devices 103 and 105.

The system computer 102 is a general processing computer system that comprises a central processing unit (CPU) 126, system memory 128, resource manager 129, and support circuits 130. In one embodiment of the invention, this system computer is the "mother board" of a computer or server. The system computer 102 uses the devices 103 and 105 to provide specific types of computing (e.g., graphics processing). The CPU 126 may be one of any form of general purpose microprocessor or microcontroller. System memory 128 comprises random access memory, read only memory, removable storage, disk drive storage, or any combination of memory devices. The resource manager 129 allocates address space to devices, such as device 103 and 105 within computing environment 100 and generates a memory map for the system memory 128. The support circuits 130 are well known circuits used to facilitate functionality of the computer system 102 including clock circuits, cache, power supplies, interface circuitry and the like.

The interconnectivity fabric 104 (hereinafter simply referred to as the "fabric") comprises one of many forms of structures that enable data to be transferred from one peer device to another peer device or to system memory. Such fabric includes an advance switching network or a bridge device supporting AGP, PCI-Express™ bus or PCI bus protocols or any other form of structure interconnectivity that may be used to interconnect peer devices. An example of interconnectivity fabric 104 known in the art is the Intel® Northbridge.

Although, in FIG. 1, peer device 103 differs from peer device 105, in some embodiments of the present invention, the logic and software of each peer device 103 and 105 may be identical. The peer device 103 includes a master GPU 106 coupled to a frame buffer 110, agent 168, and support circuits 116. Within the master GPU 106 are a MMU (memory management unit) 167, fabric interface 166, page table 136, and host logic 134. The fabric interface 166 couples host logic 134 to the fabric 104. The host logic 134 comprises a read completion mailbox 140 and a tag 142. The frame buffer 110 is typically some form of random access memory having a very large capacity, e.g., on the order of two or more gigabytes. The memory management unit 167 couples the frame buffer 110 and an agent 168 to other units within master GPU 106. The agent 168 interfaces between the master GPU 106 and one or more clients 112 (e.g., processes or hardware within the computing environment). The support circuits 116 comprise well known circuits that facilitate the functionality of the master GPU 106 including clock circuits, interface hardware, power supplies, and the like.

The peer device 105 comprises a target GPU 108 coupled to a frame buffer 118 and support circuits 124. The frame buffer 118 is typically some form of random access memory having a very large capacity, e.g., on the order of two or more gigabytes. Within the target GPU 108 is a fabric interface 174 and host logic 172. The fabric interface 174 couples host logic 172 to the fabric 104. The host logic 172 comprises a read mailbox 160, a write data mailbox 154, and a write address mailbox 156. The support circuits 124 comprise well known circuits that facilitate the functionality of the target GPU 108 including clock circuits, interface hardware, power supplies, and the like.

In operation, a data transfer process begins with one of the clients 112 requesting access to data within a frame buffer 110 or 118. The client 112 communicates to the agent 168 that is executing on the master GPU 106. The agent 168 communicates with the memory management unit 167, which determines if the request requires access to a local frame buffer, such as frame buffer 110, or if the request requires access to a peer frame buffer, such as frame buffer 118.

In a computer environment that allows the client 112 to access data within a peer frame buffer 118 in accordance with the present invention, the page table 136 is adapted to indicate which physical memory address in the peer frame buffer 118 is accessed for a particular virtual address corresponding to the read or write request from the client 112. The page table 136 is generated by the resource manager 129 during initialization to reflect the memory mapping, e.g. local, system, peer, or the like. An attribute field within the page table 136 identifies whether the data is associated with a local frame buffer 110, associated with the system memory 128, associated with a peer frame buffer 118, or not associated with a memory. As previously described above, the memory management unit 167 uses the page table 136 to determine if the read or write address for the data associated with the read or write request from the client 112 is within the peer frame buffer 118.

More specifically, information for identifying and decoding information in a local or remote frame buffer is stored in entries in the page table 136 used by the requesting peer device 103. The page table entries are maintained by resource management software and interpreted by the memory management unit 167. Importantly, the physical address and data type of each page referenced in a request from the client 112 are stored by the resource manager 129 in the page table 136. This information is needed by the target peer device 105 to provide the necessary data to the requesting peer device 103. For purposes of this description, "data type" may include, without limitation, endian ordering, compression format, data structure organization, information related to how the data is specified, any information related to how the data will be referenced or translated when fetched from or stored in local, system or peer address space, or any combination thereof.

The details of reading data from a peer frame buffer 118 are discussed with respect to FIG. 3 below, and the details of writing data to a peer frame buffer 118 are discussed with respect to FIG. 4 below.

Figure 2:
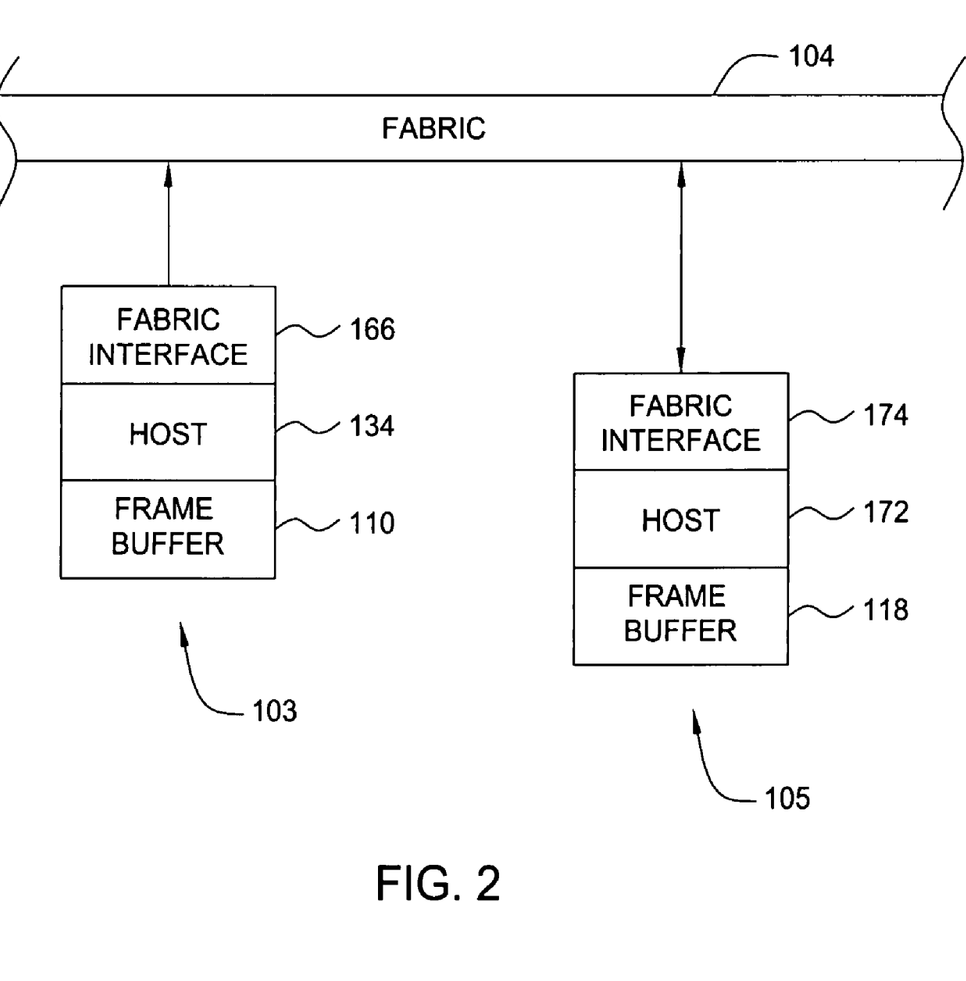
FIG. 2 depicts a functional block diagram of the computing environment of FIG. 1.

FIG. 2 depicts a functional block diagram of the computing environment of FIG. 1, specifically interconnectivity of the peer devices 103 and 105. This interconnectivity enables the peer device 103 to access (read or write) the frame buffer 118 of the peer device 105 without modification to the fabric 104 or the fabric interfaces 166, 174. As such, the fabric interfaces 166 and 174 as well as the fabric itself 104 can be any standard interconnectivity fabric and related interfaces that provide communication functionality between the peer devices 103, 105. In achieving access to the frame buffer 118 of peer device 105, the host logic 134 provides the functionality that facilitates access to the peer frame buffer 118 without alteration of the fabric interfaces 166, 174. Consequently, when a request from the client 112 for data within the peer frame buffer 118 is received by the host 134, the host logic 134 performs a translation of the data request into a protocol that is supported by the fabric interface 166. The fabric interface 166 transfers the request through the fabric 104 to the fabric interface 174 of the peer device 105. The host 172 provides functionality to access the frame buffer 118 within the remote peer device 105.

For example, if the client 112 coupled to the peer device 103 requests data from the frame buffer 118 within the peer device 105, the host logic 134 translates that request into a form that is understandable and is readily utilized by fabric interface the 166, the fabric 104, and the fabric interface 174. As such, the request will be passed from the peer device 103 to the peer device 105 and processed by the host logic 172 within the peer device 105. The host logic 172 provides access to the frame buffer 118 such that the data will either be read or written, depending on the request, within the peer device 105. If the request is a read request, the data from the frame buffer 118 is sent from the host logic 172 in such a manner that the fabric interface 174, the fabric 104 and the fabric interface 166 accept and communicate the data to the peer device 103, wherein the host logic 134 will process the data. In this manner, peer devices 103 and 105 can perform peer-to-peer data transfers without any modification to the fabric interfaces 166, 174 or the fabric 104. Consequently, peer devices containing the present invention communicate within the computing environment 100 in a standard manner using standard communication protocols.

In one specific embodiment, the fabric 104 and the fabric interfaces 166, 174 support PCI or PCI-Express™. As is well know in the art, some fabric 104 implementations using PCI and PCI-Express™ communications protocols do not permit a read request to be communicated to facilitate peer-to-peer read functions. However, those same fabric 104 implementations do permit a write request to be communicated to facilitate peer-to-peer write functions. Consequently, standard protocol permits a peer device to write data to another peer's frame buffer, but will not permit a peer device to read data from another peer's frame buffer. The present invention overcomes this shortcoming in the standard protocol by enabling host logic 134, 172 to provide enhanced functionality resulting in the capability to read and write data between peer devices.

Read Transaction

Figure 3:
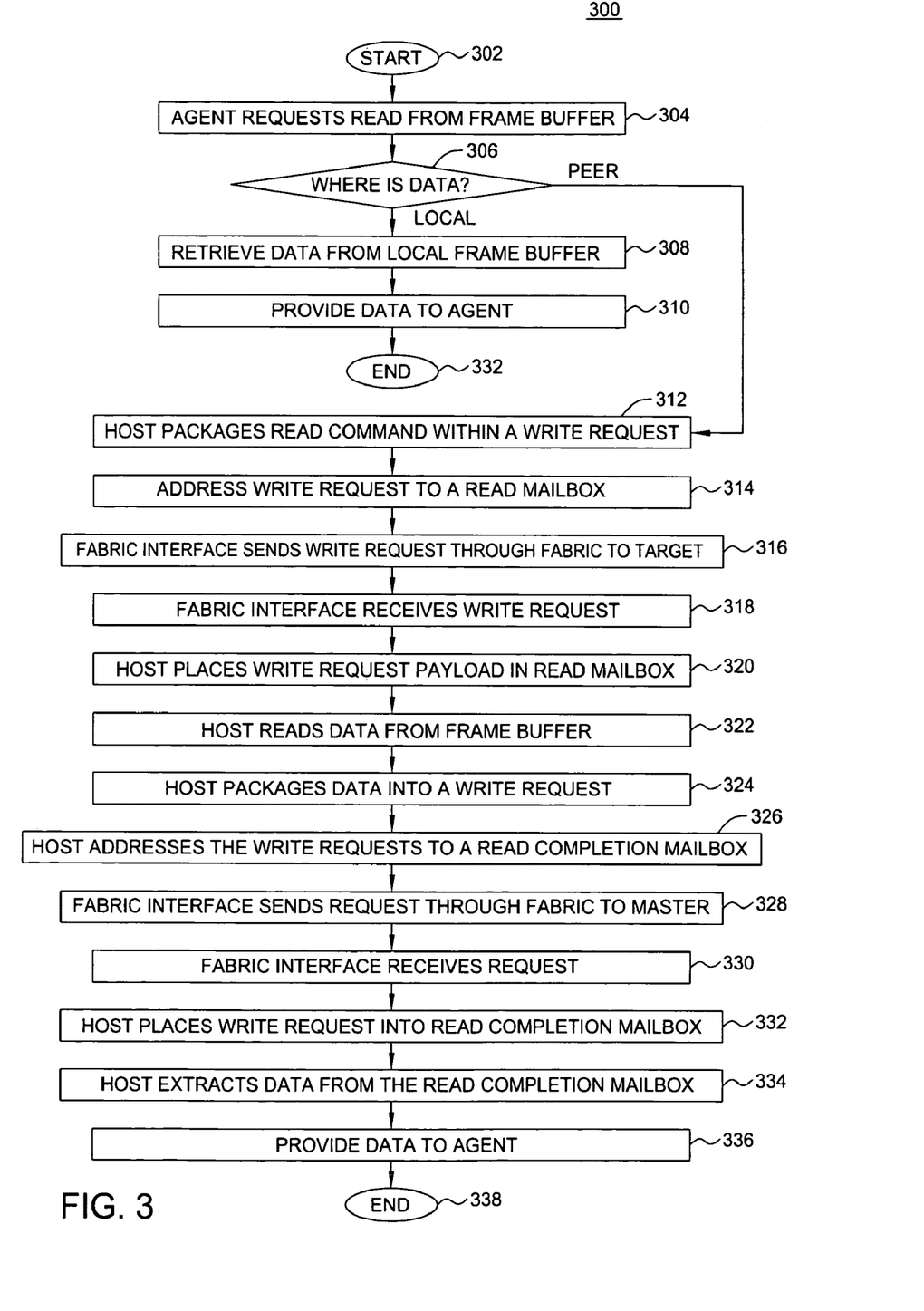
FIG. 3 depicts a flow diagram of a read process performed in accordance with one embodiment of the invention.

FIG. 3 depicts a flow diagram of a process 300 for reading data in a computing environment from peer-to-peer in accordance with the present invention. To best understand the invention, the reader should refer to both FIGS. 1 and 3. To facilitate understanding of the invention, the peer device 103 that is requesting to read data will be identified hereinafter as the "master device," while the peer device 105 that contains the information to be read will be identified as the "target device."

The process 300 starts at step 302 and proceeds to step 304 where the agent 168 in accordance with instructions from the client 112, requests to read data from the target frame buffer 118. At step 306, the master device 103 must determine where the data is located by having the memory management unit 167 access the page table 136. If that data is locally stored, the process 300 proceeds to step 408 where the data is retrieved from the local frame buffer 110. The data is then provided to the agent at step 310 and the process 300 ends at step 332.

On the other hand, if, at step 306, the data is determined to be located in the target device 105, the method 300 proceeds to step 312. At step 312, the host logic 134 within the master device 103 packages the read command from the client 112 with the address and data type into a read request packet that is written to the peer (i.e., the target device 105). Such packaging must be performed because the fabric 104 may not enable read request operations. However, the fabric 104 will understand and communicate such a write request. Therefore, the host logic 134 packages the read command information including a command field, a physical address identifying where the data is located within the peer frame buffer 118, the size of the data that is being requested, and the data type of that data (e.g., an identifier for the format used to encode the stored data). In one embodiment, the host logic 134 may determine through the memory management unit 167, the physical address of the data, the size of the data and the data type of the data from the page table 136. This read command information is placed in the payload section of the write request. A person skilled in the art will recognize, sending the physical address to the target device 105 permits the read command to be processed by target device 105 without any address translation.

At step 314, the host logic 134 addresses the write request (containing the read request packet) to a read mailbox 160 within the target device 105. In one embodiment, this read mailbox address is provided by the resource manager 164. At step 316, the fabric interface 166 sends the request through the fabric 104 to the target peer device 105. At step 318, the fabric interface 174 receives the write request. At step 320, the payload is extracted from the read request packet, thereby converting the write request containing the read request packet into a read command. The host logic 172 places the read command into the read mailbox 160, a first in first out (FIFO) buffer having a depth that is commensurate with the maximum number of transactions that the master device 103 is allowed to have outstanding. As such, this FIFO (or queue) holds each read command until it is processed by the target device 105. After step 322, the host logic 172 removes the read command from the read mailbox 160 and reads the data from the frame buffer 118 in accordance with the read command and data type. At step 324, the host logic 172 packages the retrieved data into a completion packet, transmitted as a write request packet that is consistent with the protocol supported by the fabric 104. The host logic 172 addresses the write request to the read completion mailbox 140 within the master device 103 at step 326. At step 328, the fabric interface 174 sends the write request through the fabric 104 to the requester, i.e., the client 112, via the master device 103.

At step 330, the fabric interface 166 receives the write request. At step 332, the host logic 134 within the master device 103 places the write request into the read completion mailbox 140. At step 334, the host logic 134 extracts the data from the read completion mailbox 140 and provides that data, at step 336, to the client 112 via the agent 168. The process ends at step 338.

When write requests are placed into the read completion mailbox 140 at step 332, tracking logic underlying the read completion mailbox 140 is used to track outstanding read requests and to match those outstanding requests with the read completion packets returned from the target device 105. The tracking logic may specifically store client information in order to return read data to the appropriate client 112. In some embodiments of the present invention, the read completion mailbox 140 includes storage resources, e.g., registers, RAM, or the like, that are reserved as needed by the tracking logic for storing retrieved data prior to transferring it to the client 112. In one embodiment, in the host logic 134, a tag is generated when the read command is issued and that tag is matched against the read completion tag that is received with data written into the read completion mailbox 140. Since many clients 112 may be making read requests through the agent 168 to the various frame buffers within the computing environment 100, it is important to track the issuance and completion of read requests to avoid possible errors.

As described above, the present invention enables a peer-to-peer read transaction to be performed even though the interconnection fabric 104 may not support a read transaction. As such, read transactions can be performed without modifying the standard communication protocol used by the fabric or supported in the specific implementation of the fabric.

Write Transactions

Figure 4:
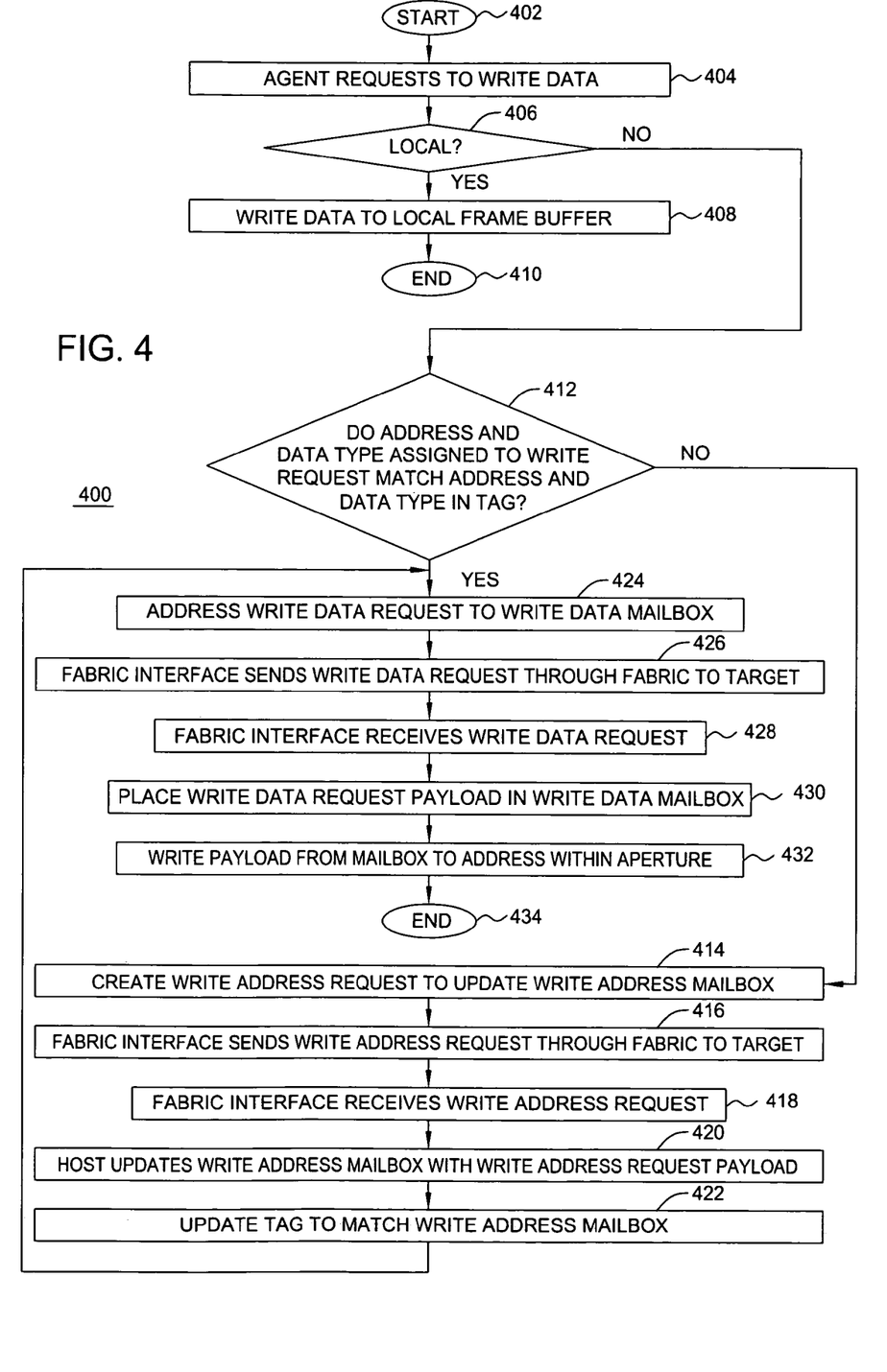
FIG. 4 depicts a flow diagram of a write process performed in accordance with one embodiment of the present invention.

FIG. 4 depicts a flow diagram of a write request transaction within a peer-to-peer computing environment in accordance with the present invention. To best understand the invention, the reader should view both FIG. 4 and FIG. 1 while reading the following disclosure.

The process 400 begins at step 402 and proceeds to step 404, where the agent 168, in response to a client 112 request, requests to write data to frame buffer 110 or 118. At step 406, the memory management unit 167 determines from the page table 136 whether the location for the data being written is within a local frame buffer 110 or within a peer frame buffer 118. If the location is within the local frame buffer 110, the process 400 proceeds to step 408 where the data is written to the local frame buffer 110, and the process ends at step 410. If, however, the data is to be written to the peer frame buffer 118, then the method 400 proceeds to step 412. At step 412, the host logic 134 compares a physical page address and data type assigned to the client 112 write request in the page table 136 to the physical page address and data type stored in the tag 142 that resides in the master device 103.

As is further described herein, the physical page address and data type listed in the tag 142 corresponds to the physical page address and data type of the last write request output to the target device 105 from the master device 103. Therefore, the physical page address and data type in tag 142 always match the physical page address and data type stored in the write address mailbox 156 within the host logic 172 of the target device 105. The physical page address stored in the write address mailbox 156 defines an aperture into the peer frame buffer 118. The aperture is a smaller region within the peer frame buffer 118. For example, the aperture may correspond to a particular memory page within the peer frame buffer 118 and the lower bits of the write request address provide an index into the aperture. The aperture may be moved by changing the physical page address in the write address mailbox 156, as described further herein. When the physical page address and data type in tag 142 match the physical page address and data type of the write request, the aperture into the peer frame buffer 118 is correctly aligned for the client 112 write request.

If, in step 412 the physical page address and data type assigned to the client 112 write request do not match the physical page address and data type listed in the tag 142, then the process 400 proceeds to step 414. At step 414, in response to a mismatch, the host logic 134 in the master device 103 creates a write address request to update the physical page address and data type listed in the write address mailbox 156. The purpose of this step is to establish an aperture position that matches the physical page address assigned to the client 112 write request so that the data contained in the client 112 write request may be properly written into the target frame buffer 118. Generally, this aperture is sized as large as a memory page of the target frame buffer 118. Likewise, the write data mailbox 154 is sized to store a memory page of the target frame buffer 118. At step 416, the fabric interface 166 of the master device 103 sends the write address request containing the physical page address and data type assigned to the client 112 write request through the fabric 104 to the target device 105.

At step 418, the fabric interface 174 of the target device 105 receives the write address request and, at step 420, the host logic 172 updates the write address mailbox 156 with the physical page address and data type included in the payload of the write address request created in step 414. When the physical page address stored in the write address mailbox 156 is changed, the aperture is moved, i.e., positioned at a different memory page within the peer frame buffer 118. At step 422, the host logic 134 updates the tag 142 to match the physical page address and data type in write address mailbox 156. At this point the aperture into the peer frame buffer 118 is correctly aligned for the client 112 write request.

At step 424, the host logic 134 addresses a write data request to the write data mailbox 154 that resides in the target device 105. The payload of the write data request may be all or part of the data included in the client 112 write request. At step 426, the fabric interface 166 sends the write data request through the fabric 104 to the target device 105. At step 428, the fabric interface 174 of the target device 105 receives the write data request. At step 430, the host logic 172 places the payload included in the write data request into the write data mailbox 154. At step 432, the payload is written from the write data mailbox 154 to an address within the aperture of the frame buffer 118 specified by the write address mailbox 156. Further, the payload is written with the format specified by the data type contained in the write address mailbox 156. The method 400 ends at step 434.

In this manner, additional amounts of data which are generally written in blocks, such as 128 bytes, can be sequentially written to the same memory page, i.e., the aperture within the target frame buffer 118. Once the aperture is positioned, the host logic 134 of the master device 103 may rapidly send sequential write data requests containing data to be stored in a region of the target frame buffer 118, e.g., the memory page, corresponding to the aperture. When a client 112 write request crosses a page boundary, the write address mailbox 156 is updated to move the aperture to a different memory page, as described above. Because the write address request sent to the write address mailbox includes a physical address in the target frame buffer 118, the target device 105 does not need to perform address translation operations for writes received from a peer device and the write process is performed very efficiently.

While the foregoing is directed to embodiments of the present invention, other and further embodiments of the invention may be devised without departing from the basic scope thereof, and the scope thereof is determined by the claims that follow.

The invention claimed is:

1. A method for performing peer-to-peer data transfer, the method comprising:
   assigning a first address and a first data type to a write request received by a first device;
   comparing a second address and a second data type listed in a tag residing within the first device with the first address and the first data type;
   creating a write data request in the first device if the second address and the second data type match the first address and the first data type, wherein the write data request contains data and is addressed to a write data mailbox residing within a second device; and
   sending the write data request from the first device to the second device through an interconnectivity fabric.

2. The method of claim 1, further comprising the step of storing the data contained in the write data request in the write data mailbox.

3. The method of claim 2, further comprising the step of writing the data to a local memory in the second device.

4. The method of claim 3, wherein the step of writing comprises writing the data within an aperture defined in part by the first address.

5. The method of claim 4, wherein a size of the aperture is equal to that of the write data mailbox.

6. The method of claim 4, wherein the aperture specifies a portion of the local memory in the second device.

7. The method of claim 3, further comprising the step of creating a write address request in the first device if the second address and the second data type do not match the first address and the first data type, wherein the write address request contains the first address and the first data type and is addressed to a write address mailbox residing within the second device.

8. The method of claim 7, further comprising the step of sending the write address request from the first device to the second device through the interconnectivity fabric.

9. The method of claim 8, further comprising the step of updating an address and a data type listed in the write address mailbox with the first address and the first data type contained in the write address request.

10. The method of claim 9, further comprising the step of updating the second address and the second data type listed in the tag to match the first address and the first data type listed in the write address mailbox.

11. The method of claim 1, wherein the data contained in the write data request is data included in the write request received by the first device.

12. The method of claim 1, wherein the step of assigning comprises accessing a page table to determine the first address and the first data type.

13. The method of claim 1, wherein the interconnectivity fabric is a bridge device supporting AGP, PCI bus or PCI express bus protocols.

14. The method of claim 1, further comprising the steps of creating and sending additional write data requests to write additional data to the local memory.

15. A system for performing peer-to-peer data transfer comprising:
- a first device;
- a second device; and
- an interconnectivity fabric,
  - wherein the first device comprises a first host logic for creating a write address request, said write address request comprising a page address and a data type, creating a write data request containing data to be written to a local memory in the second device, and a fabric interface for sending the write address request and the write data request from the first device to the second device through the interconnectivity fabric, and
  - wherein the second device comprises a second host logic for updating, in response to the write address request, an address and a data type in a write address mailbox with the page address and the data type included in the write address request, for storing the write data request in a write data mailbox and for writing the data to the local memory.

16. The system of claim 15, wherein the first host logic is further for comparing the address and the data type listed in a tag residing in the first device to an address and a data type assigned to a write request received by the first device, wherein the address and the data type assigned to the write request are the same as the page address and the data type included in the write address request.

17. The system of claim 16, wherein the first host logic is further for updating an address and a data type listed in a tag residing in the first device to the page address and the data type written to the write address mailbox from the write address request.

18. The system of claim 15, wherein the interconnectivity fabric is a bridge device supporting AGP, PCI bus or PCI express bus protocols.

19. The system of claim 15, wherein the first and second devices comprise graphics processing units and the local memory comprises a frame buffer.

20. The system of claim 15, wherein the second host logic writes the data from the write data mailbox to the local memory through an aperture.

* * * * *